(12) United States Patent
Fleurence et al.

(10) Patent No.: US 10,696,219 B2
(45) Date of Patent: Jun. 30, 2020

(54) INTERIOR LIGHTING SYSTEM FOR A MOTOR VEHICLE

(71) Applicant: VALEO VISION, Bobigny (FR)

(72) Inventors: Thierry Fleurence, Bobigny (FR); Kaoutar Ez-Zouaq, Bobigny (FR); Nicolas Boiroux, Bobigny (FR); Nirina Rasoldier, Bobigny (FR); Jingjing Xue, Bobigny (FR); Arnaud Robert, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/368,237

(22) Filed: Mar. 28, 2019

(65) Prior Publication Data
US 2019/0299851 A1 Oct. 3, 2019

(30) Foreign Application Priority Data

Mar. 30, 2018 (FR) ...................................... 18 52820

(51) Int. Cl.
*B60Q 3/60* (2017.01)
*B60Q 3/74* (2017.01)
(Continued)

(52) U.S. Cl.
CPC ................ *B60Q 3/60* (2017.02); *B60Q 3/74* (2017.02); *B60Q 3/76* (2017.02); *F21S 8/04* (2013.01);
(Continued)

(58) Field of Classification Search
CPC .... B60Q 3/60; B60Q 3/76; B60Q 3/74; F21S 8/04; F21V 5/04; F21Y 2115/10;
(Continued)

(56) References Cited

U.S. PATENT DOCUMENTS

2013/0120825 A1* 5/2013 Lambert ................ G02B 27/01
359/290
2013/0155710 A1 6/2013 Albou et al.
(Continued)

FOREIGN PATENT DOCUMENTS

DE 10 2015 115 579 A1 3/2017
EP 2 357 399 A1 8/2011
(Continued)

OTHER PUBLICATIONS

Written opinion of European search in french (Year: 2018).*
(Continued)

*Primary Examiner* — Tracie Y Green
(74) *Attorney, Agent, or Firm* — Oblon, McClelland, Maier & Neustadt, L.L.P.

(57) ABSTRACT

An interior lighting system for a vehicle, including two optical modules, each optical module including a plurality of selectively activatable light sources, a primary optical element including primary members, each arranged to face one of the light sources respectively, for collecting the rays emitted by the corresponding source, the primary optical element being configured to form an elementary beam which is dependent on the rays emitted, and a secondary optical element for projecting the elementary beam into an area of the passenger compartment. According to the invention, the optical modules are configured so that the two projected elementary beams are at least partially superimposed on one another in the area of the passenger compartment.

16 Claims, 2 Drawing Sheets

(51) Int. Cl.
| | |
|---|---|
| *F21S 8/04* | (2006.01) |
| *F21V 5/04* | (2006.01) |
| *B60Q 3/76* | (2017.01) |
| *F21W 106/00* | (2018.01) |
| *G02B 3/00* | (2006.01) |
| *F21Y 115/10* | (2016.01) |
| *F21Y 105/12* | (2016.01) |
| *F21Y 105/14* | (2016.01) |

(52) U.S. Cl.
CPC ........... *F21V 5/04* (2013.01); *F21W 2106/00* (2018.01); *F21Y 2105/12* (2016.08); *F21Y 2105/14* (2016.08); *F21Y 2115/10* (2016.08); *G02B 2003/0093* (2013.01)

(58) Field of Classification Search
CPC ............ F21Y 2105/12; F21Y 2105/14; F21W 2106/00; G02B 2003/0093
See application file for complete search history.

(56) References Cited

U.S. PATENT DOCUMENTS

| | | | |
|---|---|---|---|
| 2015/0261219 A1* | 9/2015 | Cuddihy | B60J 3/04 701/23 |
| 2017/0240105 A1 | 8/2017 | Lecorre et al. | |
| 2017/0241606 A1 | 8/2017 | Courcier et al. | |
| 2017/0356616 A1* | 12/2017 | Schiccheri | F21S 41/143 |
| 2018/0086259 A1* | 3/2018 | Bel | B60Q 3/80 |
| 2018/0086260 A1* | 3/2018 | Barillot | B60Q 3/51 |
| 2018/0087732 A1 | 3/2018 | De Lamberterie et al. | |

FOREIGN PATENT DOCUMENTS

| | | |
|---|---|---|
| EP | 2 607 164 A1 | 6/2013 |
| EP | 3 208 530 A1 | 8/2017 |
| EP | 3 210 829 A1 | 8/2017 |

OTHER PUBLICATIONS

Written opinion of European search in french machine translation (Year: 2018).*
EP321089 machine translation (Year: 2017).*
French Preliminary Search Report dated Jan. 22, 2019 in French Application 18 52820, filed on Mar. 30, 2018 (with English Translation of Categories of Cited Documents).

* cited by examiner

INTERIOR LIGHTING SYSTEM FOR A MOTOR VEHICLE

The present invention relates to an interior lighting system for a motor vehicle, capable of projecting pixelated light beams, forming an assembly for projecting a pixelated image into an area of the passenger compartment.

Existing interior lighting devices integrated into the passenger compartment of a motor vehicle have restricted functionality. As a general rule, interior lighting devices are limited to lamps integrated into the ceiling light that can act as reading lights, and to other light sources that can create mood lighting, notably in order to accentuate areas of the passenger compartment.

The integration of the interior lighting devices into the ceiling light makes it necessary to consider the problems of overall dimensions in the passenger compartment of the vehicle, and the development of new functionality for optimized interior lighting is therefore limited.

More generally, in the field of front lighting of motor vehicles, manufacturers may be required to offer a matrix lighting function in order to provide an adaptive lighting function, called "ADB" or "Adaptive Driving Beam" in English. In a known way, such a lighting and/or signalling device comprises at least one optical module designed to emit a segmented final light beam, composed of a plurality of contiguous elementary beams, longitudinally forwards from the vehicle. Such a module usually comprises a matrix of primary light sources, a plurality of light guides and a projection optics system. Each source is associated with a light guide designed to shape the emitted rays into a narrower pencil beam forming a pixel which is usually rectangular or square. By controlling the light sources individually and selectively, it is possible to modulate the forward-projected elementary beam representing an image of the matrix of elementary light sources, and, notably, to make dark areas appear in the final beam.

In another known arrangement, the optical modules as described above may be associated with reflection means composed of at least one output reflector for generating indirect imaging, for example at least one flat, concave or convex mirror or a ray deflection matrix of the micro-mirror type. Such a reflector is capable of receiving and reflecting at least one light beam before its output, the light beam being emitted and shaped by a matrix of light sources associated with light guides, and then concentrated, in a first direction, by an additional projection optics system of the lens type. The reflector serves to deflect the light beam from the first direction to a second direction which is orientated towards the glazed output surface of the lighting and/or signalling device.

Because of their complexity and overall dimensions, prior art lighting modules are difficult to integrate into the passenger compartment of a vehicle for an interior lighting application.

The invention lies within this context and aims to improve the definition of the interior lighting beams of a motor vehicle while making it possible to diversify the images projected into the passenger compartment. For this purpose, the invention proposes a direct imaging interior lighting system which emits an easily modifiable pixelated light beam. Due to a simplified and flexible arrangement and reduced overall dimensions, compatible with the limited space of a passenger compartment, the lighting system according to the invention has the advantage of being able to multiply the interior lighting configurations while providing greater efficiency.

The invention proposes an interior lighting system for a vehicle comprising two optical modules, each optical module comprising a plurality of selectively activatable light sources; a primary optical element comprising primary members, each arranged to face one of the sources respectively, for collecting the rays emitted by the corresponding source, the primary optical element being configured to form an elementary beam which is dependent on the rays emitted; and a secondary optical element for projecting the elementary beam into an area of the passenger compartment.

According to a characteristic of the invention, the optical modules are configured so that the two projected elementary beams are at least partially superimposed on one another in said area of the passenger compartment.

According to a characteristic of the invention, the optical modules are arranged so as to operate in direct imaging mode, with direct stacking of the light sources and the primary members.

According to a first embodiment of the invention, the optical modules are configured in such a way that the two projected elementary beams which are at least partially superimposed on one another have complementary shapes, the shape of a first elementary beam being the negative of the other elementary beam when all the light sources are activated.

According to a second embodiment of the invention, the optical modules are configured in such a way that the two projected elementary beams which are at least partially superimposed on one another have complementary shapes, in that, when all the light sources are activated, the illuminated areas of a first elementary beam are superimposed on the dark areas of the other elementary beam, at least one illuminated area of the first elementary beam also extending so as to partially cover at least one illuminated area of the other elementary beam adjacent to the dark area of this elementary beam which is covered by the at least one illuminated area of the first elementary beam.

According to a series of characteristics of the interior lighting system that may be considered singly or in combination, it may be provided that:
- the optical modules each have a respective optical axis and are arranged so that their optical axes are not parallel to one another and converge towards one another,
- the optical axes of the optical modules are inclined relative to one another at an angle of between 0.5° and 3°,
- the optical axes of the optical modules are inclined relative to a vertical axis of the vehicle at an angle of between 5° and 15°,
- each optical module has an overall dimension of between 15 and 25 millimetres along a longitudinal direction parallel to the optical axis of this optical module.

According to another series of characteristics of the interior lighting system that may be considered singly or in combination, it may be provided that:
- the primary members and the primary optical element of at least one optical module form a single piece,
- the primary optical elements of the two optical modules form a single piece,
- the secondary optical elements of the two optical modules form a single piece.

According to another characteristic of the interior lighting system, it may be provided that the primary members of a first optical module are arranged to form a first matrix array and the primary members of a second optical module are arranged to form a second matrix array, the first and second matrix arrays having complementary shapes.

According to various characteristics of the interior lighting system according to the invention considered singly or in combination, it may be provided that:
- the light sources are light-emitting diodes, which may be suitable for surface mounting on a printed circuit board,
- the primary and secondary optical elements are configured to form in the elementary beam a trapezoidal image of each of the outputs of the primary members,
- a plurality of primary members have a square cross section,
- a plurality of primary members have a round cross section.

Other characteristics and advantages of the invention will be more readily apparent from a perusal of the detailed description of embodiments of the invention provided below by way of illustrative and non-limiting examples, based on the appended figures, which show the interior lighting system of a motor vehicle capable of emitting a pixelated light beam, among which figures.

Figure 5:
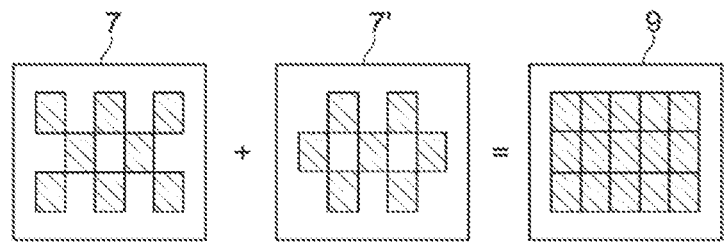

and FIG. 5 is a schematic view of the complementarity of shape of two elementary light beams which are projected at the output of the optical modules forming the interior lighting system, and which, according to the invention, are at least partially superimposed on one anther to provide a pixelated image.

While the figures show the invention in a detailed manner for the purpose of its application, they may evidently serve to define the invention more closely if necessary. Similarly, it should be noted that, for all the figures, the same elements are denoted by the same references. It is also to be understood that the embodiments of the invention illustrated by the figures are provided by way of non-limiting example. Other configurations of the interior lighting system according to the invention may therefore be produced, notably by varying the arrangement and the dimensions of the primary elementary light sources, of the primary optical element, particularly of the primary members, and of the secondary optical element.

Figure 2:
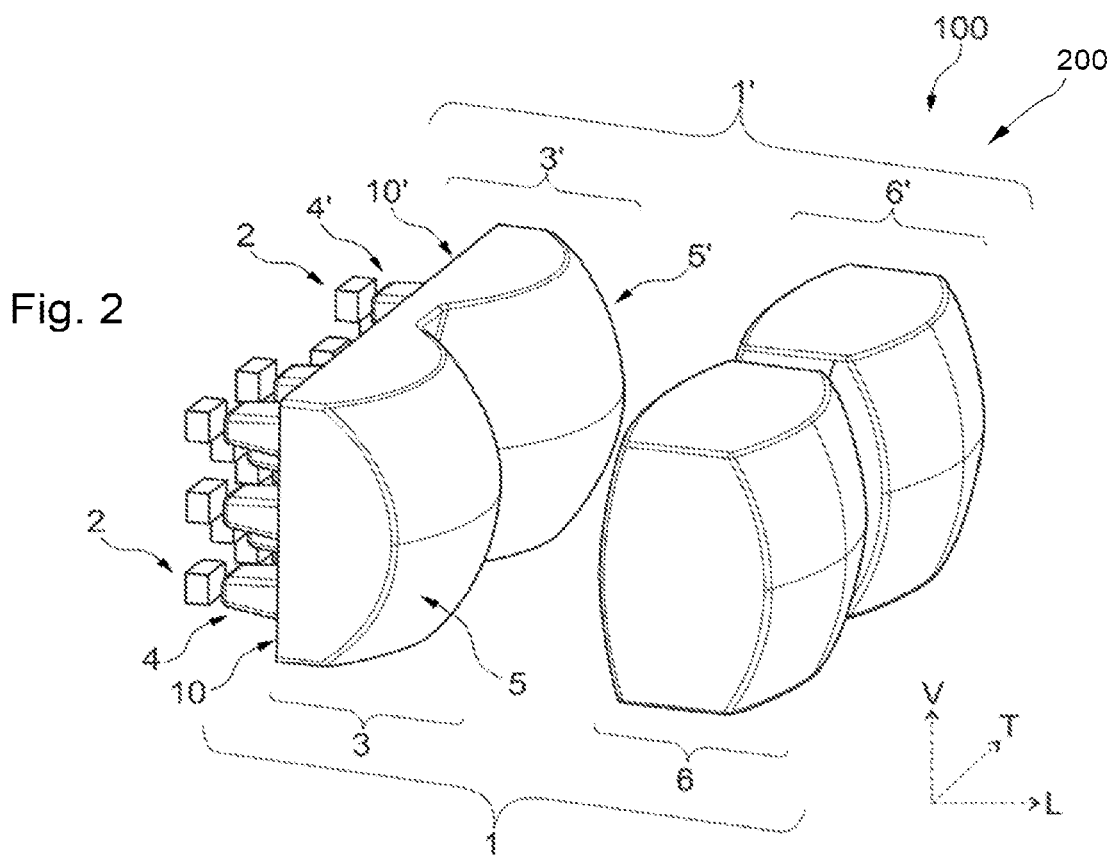
FIG. 2 is a perspective view of the interior lighting system of the invention according to a first arrangement of the optical modules forming this interior lighting system.
Figure 3:
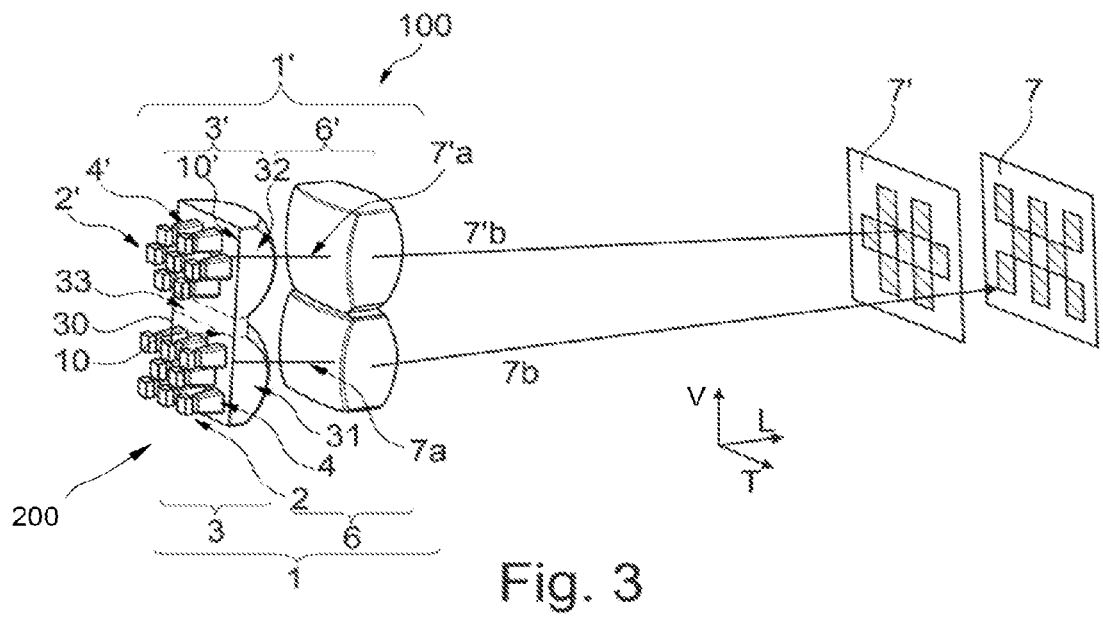
FIG. 3 is a rear perspective view of the interior lighting system of the invention according to a second arrangement of the optical modules forming this interior lighting system, showing the elementary light beams which are projected by each of these modules and are made to be superimposed on one another.
Figure 4:
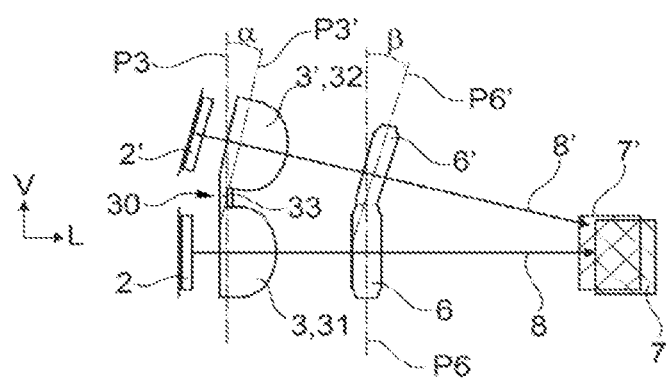
FIG. 4 is a schematic representation of the interior lighting system of the invention, in a side view so that the inclination relative to one another of the optical elements forming the two optical modules is made more particularly visible.

In the remainder of the description, notably with respect to the reference frame L, V, T shown in FIGS. 2 to 4, the following orientations will be used in a non-limiting way:
- longitudinal L, defined by a longitudinal axis of elongation of the interior lighting system of the invention which may be used to define a rear-to-front arrangement off its constituent elements, particularly that of a plurality of light sources, a primary optical element and a secondary optical element;
- vertical V, with reference to a vertical axis perpendicular to the ground on which the vehicle travels; and
- transverse T, with reference to an axis perpendicular to the longitudinal and vertical axes described previously in a direction substantially parallel to the ground on which the vehicle travels.

Figure 1:
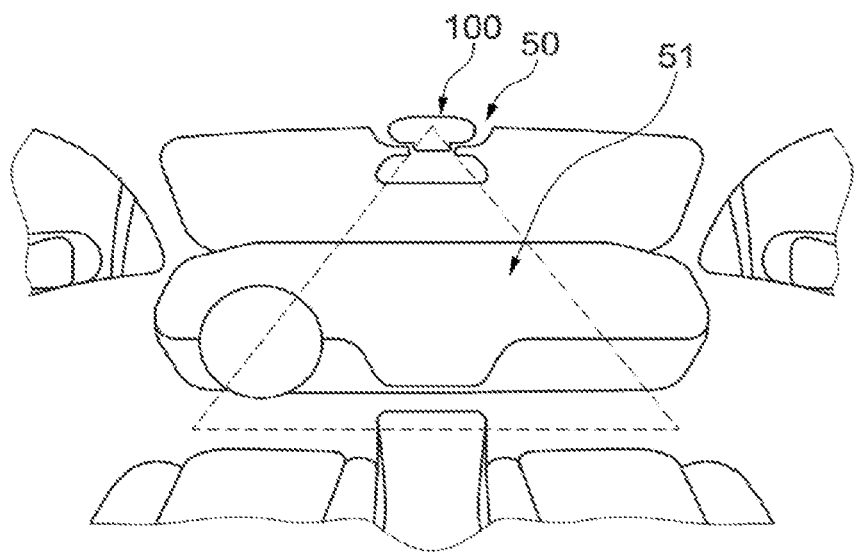
FIG. 1 shows a possible way of integrating the interior lighting system according to the invention into the passenger compartment of a motor vehicle.

FIG. 1 shows the installation of an optical system 200 in a motor vehicle passenger compartment to form an interior lighting system 100 which is configured to illuminate the passenger compartment in an application of the reading light type, and is arranged for this purpose, for example, in the central front ceiling light 50 of the vehicle. In this configuration, the interior lighting system 100 is configured to project elementary light beams which are at least partially superimposed on one another, as described in greater detail below, to form at least one area of illumination 51 which may extend over a surface, for example a glazed surface of the vehicle, or a volume that may incorporate, for example, the dashboard and the seat cushions of the front seats of the vehicle.

Evidently, it would be feasible to install the interior lighting system 100 in the passenger compartment in any other way, for example in a rear central ceiling light, laterally over the doors, at the comfort handles, or in a front and/or rear central console.

As it will be described, the interior lighting system 100 according to the invention comprises light sources which can be selectively activated to generate elementary beams that may vary in time in their periodicity, their intensity and/or their colours, so as to form, in at least one area of the passenger compartment, at least one clear static and/or dynamic pixelated image such as a mood image, a logo or an icon.

FIG. 2 shows the optical system 200, which in this case is capable of forming an interior lighting system 100, in which two optical modules 1, 1' are arranged side by side, in a transverse direction in this case. According to the invention, each optical module 1, 1' comprises, from the rear to the front along a longitudinal axis, a plurality of light sources 2, 2', a primary optical element 3, 3' and a secondary optical element 6, 6' configured to allow the projection of an elementary beam 7, 7' (visible in FIG. 3) in an area of the passenger compartment.

The primary optical element 3, 3' comprises a rear part in which are arranged primary members 4, 4', arranged facing respective light sources 2, 2', and a front part which forms a lens 5, 5'.

The light sources 2, 2' are usually formed by light-emitting diodes, also called LEDs, which are surface mounted on a printed circuit board, not shown here, and which may be individually controlled. Because of its application to a motor vehicle passenger compartment, the space dedicated to the installation of the interior lighting system is limited. It is therefore necessary to use small light sources which may be, for example, light-emitting diodes of the type called SMD, an English abbreviation for "Surface Mounted Device", or diodes of the type called COB, an English abbreviation for "Chip On Board".

The primary optical element 3, 3' arranged in front of the light sources 2, 2' so as to be located on the path of the rays emitted by these light sources, is capable of modifying the distribution of these emitted rays. For this purpose, as illustrated, the primary members 4, 4' arranged in the rear part of the primary optical element may each take the form of a respective light guide, the set of these light guides formed in this way constituting a pixel optical system.

The light guides extend in a generally longitudinal manner, and at their opposed longitudinal ends they have a face for the input of the light rays emitted by the light sources 2, 2' and a face for the output of these light rays. The light guides may have a square, rectangular and/or round cross section, and it is to be understood that the shape of the light guides may be identical or different within a single optical module 1, 1'. Each light guide is thus coupled to a light-emitting diode so that most of the light rays emitted by a light-emitting diode penetrate into the light guide dedicated to them via an input face of this guide, and are guided to the corresponding output face from which the rays emerge, having been shaped into a narrower pencil beam forming a square, rectangular or round pixel.

The lens 5, 5' forming the front part of the primary optical element 3, 3' comprises an input plane dioptre 10, 10' and an output face having a substantially hemispherical profile. Each lens 5, 5' of a primary optical element 3, 3' may thus take the form of a converging plano-convex lens. The primary members 4, 4', each formed by a light guide, are positioned to project from the input plane dioptre 10, 10' so that the output face of each guide is positioned in the plane of the input plane dioptre.

The primary members 4, 4' may be formed separately from the primary optical element 3, 3' forming the lens 5, 5'. However, in a preferred embodiment of the invention, the primary members 4, 4' form a single piece with the primary optical element 3, 3' of at least one optical module 1, 1'. In the illustrated example, each module 1, 1' comprises a primary optical element 3, 3' and primary members 4, 4' made in one piece, and the two primary optical elements 3, 3' and the integrated primary members 4, 4' may form a single piece common to the two optical modules 1, 1'.

Thus, although they are made separate from one another by the specific arrangement of the light guides that they provide and the light beams that the activation of their corresponding light sources may generate, the primary optical elements 3, 3' of the optical modules 1, 1' may together form a single piece 30. In this single piece, the primary optical elements 3, 3' form, respectively, first and second optical areas 31, 32, separated from one another by an optically neutral linking area 33, through which the rays emitted by the light sources 2, 2' do not pass, or only pass to a small extent.

More particularly, FIG. 2 shows particularly clearly this substantially flat linking area 33 which separates the two optical areas 31, 32 in the form of spherical lenses as defined above.

The configuration of the interior lighting system 100, and more particularly the position of the primary optical element 3, 3' forming the lens 5, 5' and the secondary projection optical element 6, 6', is such that the output faces of the light guides arranged in the plane of the input plane dioptre 10, 10' are positioned substantially in the object focal plane of the secondary projection optical element 6, 6'.

The secondary projection optical element 6, 6' here forms an additional lens, preferably biconvex, and is capable of concentrating at its output an adaptive elementary light beam 7, 7' along an optical axis 8, 8' (visible in FIG. 3) determined as a function of the arrangement and orientation of this secondary optical element and the set of optical components of the corresponding optical module, in order to project an image of the light sources 2, 2' longitudinally forwards.

Advantageously, the primary optical elements 3, 3' and secondary optical elements 6, 6' are configured to form, in the elementary beam 7, 7', a trapezoidal image of each of the outputs of the light guides forming the primary members 4, 4'.

In the example shown in FIG. 2, and in accordance with what has been described for the primary optical elements, the secondary optical elements 6, 6' of the two optical modules 1, 1' form a single piece, it being understood that the additional lenses of the secondary optical elements 6, 6' may have different optical configurations and/or inclinations from one another.

Because of the constraints on overall dimensions described above, the longitudinal dimensions of the interior lighting system comprising the two optical modules 1, 1' must be substantially of the order of 20 mm. To enable all the components of the interior lighting system to be integrated within these overall dimensions, the optical modules 1, 1' are arranged so as to operate in direct imaging mode, with direct stacking along the longitudinal axis of the light sources 2, 2', the primary members 4, 4', the primary optical elements 3, 3' and the secondary optical elements 6, 6'.

In a preferred embodiment of the interior lighting system 100, each optical module 1, 1' has an overall dimension of between 15 and 25 millimetres along a longitudinal direction parallel to the optical axis 8, 8'.

FIG. 3 shows an interior lighting system 100 according to the invention which comprises a particular arrangement of the optical modules of which it is composed. More particularly, the two optical modules 1, 1' are here superimposed on one another in a vertical direction. This arrangement does not modify in any way the number and nature of the components of the optical modules 1, 1' which, as described previously, each comprise, from the rear to the front, a plurality of light sources 2, 2', a primary optical element 3, 3' forming a lens 5, 5' and associated with primary members 4, 4', each of which faces a respective one of the light sources, and a secondary optical element 6, 6' forming an additional lens for the projection of an elementary beam 7, 7' in an area of the passenger compartment.

In this FIG. 3, in accordance with what was described previously with reference to FIG. 2, the primary optical elements 3, 3' of the optical modules are formed from a single piece, as are the secondary optical elements 6, 6', and this FIG. 3 shows the fact that the optical modules may be positioned in any orientation, since, as described below, the primary and secondary optical elements of each optical module are configured so that the elementary light beams which they participate in projecting are at least partially superimposed on one another.

FIG. 3 also provides a representation of the optical system with a viewing angle different from that of FIG. 2, showing more clearly one of the differences between one of the modules and the other, namely the positioning of the primary members projecting from the input face of the lens forming part of the primary optical element.

Each optical module comprises primary members, or light guides, which each face a respective light source and are arranged in three rows.

In the first optical module 1, eight primary members are arranged in three rows, with three primary members in the first row, two primary members in the second row, and once again three primary members in the third row. The light guides arranged on the same row are spaced apart with a transverse spacing, that is to say in the direction of the series of guides in the row, substantially equal to the transverse dimension of a light guide at the input plane dioptre of the primary optical element. The light guides are also offset transversely from one row to another so as to have a quincuncial arrangement, one of every two lines being transversely offset.

In the second optical module 1', seven primary members are arranged in three rows, with two primary members in the first row, three primary members in the second row, and once again two primary members in the third row. As has been described for the first optical module, the light guides arranged on the same row are spaced apart from one another with a transverse spacing, that is to say in the direction of the series of guides in the row, substantially equal to the transverse dimension of a light guide at the input plane dioptre of the primary optical element. The light guides are also offset transversely from one row to another so as to have a quincuncial arrangement, one of every two lines being transversely offset.

The orientation of FIG. 3 also makes it possible to illustrate schematically the projected elementary light beams, it being understood that the statements made below in relation to the arrangement of the optical modules of FIG. 3 are valid for the other arrangements, and notably that shown in FIG. 2.

FIG. 3 shows, for each of the optical modules 1, 1', the path of a ray emitted by a light source 2, 2' and made to pass successively through a primary member 4, 4', the front part of the associated primary optical element 3, 3', and then the associated secondary optical element 6, 6'.

According to the invention, the optical modules 1, 1' are configured so that the two elementary light beams 7, '7' projected at the output of the secondary optical elements 6, 6' are at least partially superimposed on one another to provide, in an area of the passenger compartment, a pixelated image 9 illustrated in FIG. 5. To achieve the superimposition of the projected elementary light beams 7, 7', the optical modules 1, 1' are arranged so that their optical axes 8, 8' are not parallel to one another and converge towards one another. For this purpose, the additional lenses of the secondary optical elements 6, 6', and/or the lenses 5, 5' forming the front part of the primary optical elements 3, 3', and/or the primary optical elements as a whole, may have different optical configurations and/or inclinations from one another so as to provide a deflection of at least one elementary light beam 7, 7' and achieve the convergence of the two elementary light beams 7, 7' towards one another.

In the illustrated embodiment, a ray emitted by a first light source 2 of the first optical module 1 is propagated by successive reflections in the first primary member 4 arranged facing the first light source, and leaves the first primary optical element 3 via the output dioptre of the first lens 5 in a first direction 7$a$, towards the first secondary optical element 6. This first secondary optical element 6 forming an additional lens causes, as a result of its shape and its arrangement in the passenger compartment, the deflection of the ray in a second direction 7$b$, inclined relative to the first direction 7$a$. The set of rays emitted by the first light sources 2 associated with the first optical module 1 thus forms a first elementary light beam 7 projected into the passenger compartment.

Similarly, a ray emitted by a second light source 2' of the second optical module 1' is propagated by successive reflections in the second primary member 4' arranged facing the second light source, and leaves the second primary optical element 3' via the output dioptre of the second lens 5' in a third direction 7'$a$, towards the second secondary optical element 6'. This second secondary optical element 6' forming an additional lens causes, as a result of its shape and its arrangement in the passenger compartment, the deflection of the ray in a fourth direction 7'$b$, inclined relative to the third direction 7'$a$. The set of rays emitted by the second light sources 2' associated with the second optical module 1' thus forms a second elementary light beam 7' projected into the passenger compartment.

The longitudinal axis of the optical system may be arbitrarily defined as coinciding with the optical axis of the first optical module 1. The components of the first optical module 1 are positioned relative to one another so that the rays emitted by the first light sources allow projection along this first optical axis on to a specified area of the passenger compartment. At least one of the primary optical element and the secondary optical element of the second optical module has an inclination relative to the primary optical element or the secondary optical element, respectively, of the first optical module, so that the rays emitted by the second light sources of the second optical module, and therefore from a position offset transversely (FIG. 2) or vertically (FIG. 3) relative to the initial position assumed by the first light sources of the first optical module, can result in projection on to the same specified area of the passenger compartment.

In other words, and as shown schematically in FIG. 4, which this time provides a side view, the second primary optical element 3' and/or the second secondary optical element 6' extend mainly in extension planes P3', P6' inclined relative to the extension planes P3, P6 in which the first primary optical element 3' and/or the first secondary optical element 6', respectively, extend. In FIG. 4, by way of non-limiting example, the extension planes of the primary optical elements 3, 3' are inclined relative to one another at a first angle $\alpha$, and the extension planes of the secondary optical elements 6, 6' are inclined relative to one another at a second angle $\beta$, it being understood that the inclination shown here is accentuated to make it perceptible in the figure.

Evidently, in this example of embodiment, the second elementary beam 7' of the second optical module 1', deflected relative to the optical axis 8', converges towards the optical axis 8 and is superimposed on the elementary beam 7 of the optical module 1 to create a pixelated final image 9. In a preferred embodiment of the invention, the optical axes 8, 8' of the optical modules 1, 1' are inclined relative to one another at an angle of between 0.5° and 3°. Additionally, the optical axes 8, 8' of the optical modules 1, 1' may be inclined relative to a vertical axis of the vehicle, substantially perpendicular to the principal plane defined by the roof and/or the floor of said vehicle, at an angle of between 5° and 15°.

As specified above, according to a characteristic of the invention, the primary optical elements of each of the optical modules form a single piece. The same may apply to the secondary optical elements of each of the optical modules. Evidently, such an arrangement in a single piece of the primary optical elements can facilitate the positioning of these primary optical elements in the optical system relative to the other components. The assembly operation is simplified and rendered less expensive, but it should be noted that it makes it possible, above all, to ensure the correct positioning of the main extension plane of one primary optical element relative to the extension plane of the other. Thus, and notably when the secondary optical elements of the two optical modules are also made in a single piece, the correct superimposition of the projected elementary light beams can be ensured.

FIG. 5 shows schematically the complementarity of shape of the images of the two elementary beams 7, 7' projected by the secondary optical elements 6, 6' at the output of the optical modules 1, 1', these images being at least partially superimposed on one another to create a final pixelated image 9 in an area of the passenger compartment of the vehicle.

For this purpose, the light sources 2, 2' associated with the light guides forming the primary members 4, 4' are arranged, respectively, in first and second matrix arrays, separate from one another but having complementary shapes. In other words, the first light guides associated with the first optical module are arranged in a matrix of X rows and Y columns, in this case three rows and five columns, in which the first light guides and the first associated light sources occupy first locations in the matrix X,Y, and the second light guides associated with the second optical module are arranged in the same matrix of X rows and Y columns, in this case three rows and five columns, in which the second light guides and the second associated light sources occupy second locations in the matrix, separate from the corresponding first locations. Thus the matrix of X rows and Y columns can be defined as a checkerboard, with the arrangement of the first guides of the first optical module corresponding to an occupation of the white squares and the arrangement of the second guides of the second optical module corresponding to an occupation of the complementary black squares. It will be understood that a vacant location on the second matrix array corresponds to a first light guide arranged on the first matrix array and having a location defined by a given row and column.

Consequently, when all the light sources 2, 2' are activated, the shape of the first elementary beam 7 resulting from the arrangement of the first matrix array of the light sources 2 of the first optical module 1 is the negative of the shape of the second elementary beam 7' resulting from the arrangement of the second matrix array of the light sources 2' of the second optical module 1'.

In the illustrated example, and as may be seen, notably, in FIG. 5, when all the first light sources 2 are switched on, the first elementary beam 7 output from the first optical module 1 has a checkerboard configuration, comprising illuminated areas, corresponding to the output faces of the light guides of the primary members 4, and dark areas, corresponding to the areas located between the output faces. Similarly, when all the second light sources 2' are illuminated, the second elementary beam 7' output from the second optical module 1' has a complementary checkerboard configuration which is the negative of that emitted by the first elementary beam 7.

Consequently, in the output of the interior lighting system 100, in the area of the passenger compartment on to which are projected the two elementary light beams that are made to be superimposed on one another, the illuminated areas of the first elementary beam 7 emitted by the first optical module 1 are superimposed on the dark areas of the second elementary beam 7' emitted by the second optical module 1'. To prevent the persistence of any parasitic dark areas after the superimposition of the complementary elementary beams 7, 7', or in order to avoid any difference in contrast between the complementary illuminated areas, the emission surface of at least one illuminated area of the first elementary beam 7 may be extended so that it covers, at least partially, an illuminated area of the second elementary beam 7' adjacent to the dark area forming the negative of said illuminated area of the first elementary beam 7. As a result of the enlargement of the emission surface of the illuminated areas, the final image 9 obtained by the superimposition of the elementary beams 7, 7' and projected into the passenger compartment is a complete, homogeneous and sharp image.

The optical system of the interior lighting system 100 according to the invention has the advantage of being flexible. Thus, in order to extend the lighting functionality in the passenger compartment, the configuration of the elementary beams 7, 7' may be adjusted to diversify the pixelated final image 9, notably on the basis of the requirements of the users of the vehicle. For this purpose, provision may be made to combine a first matrix array of primary members 4 with square cross sections of the first optical module 1 with a second matrix array of primary members 4' with round cross sections of the second optical module 1', or to provide primary members with different cross sections within the same matrix array.

In a variant, provision may be made to adjust the light sources 2, 2', notably by selectively controlling these sources. The individual control of the light sources 2, 2', particularly by switching the light-emitting diodes on or off, permits variations of shape, brightness or colour in the pixels of the elementary beams 7, 7' and consequently in the final pixelated image 9. This control requires no modification of the optical system according to the invention, and enables the interior lighting functions to be diversified by projecting into the passenger compartment, for example, a logo, an icon, or a high-definition mood image.

The foregoing description clearly explains how the invention makes it possible to achieve the aims set for it, and notably to propose a simplified interior lighting system with small overall dimensions, comprising two optical modules each capable of forming a pixelated elementary beam in order to obtain a pixelated image projected into at least one area of the passenger compartment. The interior lighting system according to the invention makes it possible to improve the definition of the projected image and to extend the functionality of the interior lighting for a motor vehicle.

The invention is not limited to the embodiments specifically provided in this document by way of non-limiting examples, and extends, in particular, to all equivalent means and any technically feasible combination of these means. Thus the characteristics, the variants and the different embodiments of the invention may be associated with one another in various combinations, provided that they are not incompatible or mutually exclusive. It would be possible, notably, to imagine variants of the invention comprising only a selection of the characteristics described, provided that, according to the invention, the interior lighting system comprises two optical modules configured so that the two projected elementary beams are at least partially superimposed on one another in an area of the passenger compartment of a motor vehicle.

The invention claimed is:

1. An interior lighting system for a vehicle, the interior lighting system comprising two optical modules, each optical module comprising:
    a plurality of selectively activatable light sources;
    a primary optical element comprising primary members, each primary member arranged to face one of the light sources respectively, for collecting the rays emitted by the corresponding light source, the primary optical element being configured to form an elementary beam; and
    a secondary optical element for projecting the elementary beam into an area of a passenger compartment, wherein the optical modules are configured so that the two projected elementary beams are at least partially superimposed on one another in the area of the passenger compartment, wherein the optical modules are configured so that the two projected elementary beams which are at least partially superimposed on one another have complementary shapes, the shape of a first elementary beam being the negative of the other elementary beam when all the light sources are activated.

2. The interior lighting system according to claim 1, wherein the optical modules are arranged so as to operate in a direct imaging mode, with direct stacking of the light sources and the primary members.

3. The interior lighting system according to claim 1, wherein the optical modules each have a respective optical axis and are arranged so that their optical axes are not parallel to one another.

4. The interior lighting system according to claim 1, wherein optical axes of the optical modules are inclined relative to one another at an angle of between 0.5° and 3°.

5. The interior lighting system according to claim 1, wherein optical axes of the optical modules are inclined relative to a vertical axis of the vehicle at an angle of between 5° and 15°.

6. The interior lighting system according to claim 1, wherein the primary members and the primary optical element of at least one optical module form a single piece.

7. The interior lighting system according to claim 1, wherein the primary members of a first optical module are arranged to form a first matrix array and the primary members of a second optical module are arranged to form a second matrix array, the first and second matrix arrays having complementary shapes.

8. The interior lighting system according to claim 2, wherein when all the light sources are activated, illuminated areas of a first elementary beam are superimposed on dark areas of the other elementary beam, at least one illuminated area of the first elementary beam also extending so as to partially cover at least one illuminated area of the other elementary beam adjacent to the dark area of the elementary beam which is covered by the at least one illuminated area of the first elementary beam.

9. The interior lighting system according to claim 2, wherein the optical modules each have a respective optical axis and are arranged so that their optical axes are not parallel to one another.

10. The interior lighting system according to claim 2, wherein optical axes of the optical modules are inclined relative to one another at an angle of between 0.5° and 3°.

11. The interior lighting system according to claim 2, wherein optical axes of the optical modules are inclined relative to a vertical axis of the vehicle at an angle of between 5° and 15°.

12. The interior lighting system according to claim 2, wherein the primary members and the primary optical element of at least one optical module form a single piece.

13. The interior lighting system according to claim 2, wherein the primary optical elements of the two optical modules form a single piece.

14. The interior lighting system according to claim 2, wherein the primary members of a first optical module are arranged to form a first matrix array and the primary members of a second optical module are arranged to form a second matrix array, the first and second matrix arrays having complementary shapes.

15. An interior lighting system for a vehicle, the interior lighting system comprising two optical modules, each optical module comprising:
   a plurality of selectively activatable light sources;
   a primary optical element comprising primary members, each primary member arranged to face one of the light sources respectively, for collecting the rays emitted by the corresponding light source, the primary optical element being configured to form an elementary beam; and
   a secondary optical element for projecting the elementary beam into an area of a passenger compartment, wherein the optical modules are configured so that the two projected elementary beams which are at least partially superimposed on one another have complementary shapes so that, when all the light sources are activated, illuminated areas of a first elementary beam are superimposed on dark areas of the other elementary beam, at least one illuminated area of the first elementary beam also extending so as to partially cover at least one illuminated area of the other elementary beam adjacent to the dark area of the elementary beam which is covered by the at least one illuminated area of the first elementary beam.

16. An interior lighting system for a vehicle, the interior lighting system comprising two optical modules, each optical module comprising:
   a plurality of selectively activatable light sources;
   a primary optical element comprising primary members, each primary member arranged to face one of the light sources respectively, for collecting the rays emitted by the corresponding light source, the primary optical element being configured to form an elementary beam; and
   a secondary optical element for projecting the elementary beam into an area of a passenger compartment, wherein the primary optical elements of the two optical modules form a single piece.

* * * * *